United States Patent [19]

Kruehler et al.

[11] 4,162,184

[45] Jul. 24, 1979

[54] PRODUCING LAYERED PENTA-ULTRAPHOSPHATE MONOCRYSTALS

[75] Inventors: Wolfgang Kruehler, Unterhaching; Rolf Plaettner, Ottobrunn, both of Fed. Rep. of Germany

[73] Assignee: Siemens Aktiengesellschaft, Berlin & Munich, Fed. Rep. of Germany

[21] Appl. No.: 821,782

[22] Filed: Aug. 4, 1977

[30] Foreign Application Priority Data

Aug. 31, 1976 [DE] Fed. Rep. of Germany ....... 2639221

[51] Int. Cl.$^2$ ............................................. B01J 17/06
[52] U.S. Cl. ..................................... 156/621; 423/305
[58] Field of Search ................ 156/621, 622; 428/538; 423/305, 306; 252/301.4 P

[56] References Cited

U.S. PATENT DOCUMENTS

| | | | |
|---|---|---|---|
| 3,893,939 | 7/1975 | De Kalb | 252/301.4 P |
| 4,002,725 | 1/1977 | Bridenbaugh | 423/305 |
| 4,043,860 | 8/1977 | Coin et al. | 423/305 |

FOREIGN PATENT DOCUMENTS 1943771  9/1970  Fed. Rep. of Germany .... 252/301.4 P

OTHER PUBLICATIONS

Weber, Review Nd Pentaphosphate Lasers, 1975, 431-442, Optical and Quantum Electronics 7.

*Primary Examiner*—Hiram H. Bernstein
*Attorney, Agent, or Firm*—Hill, Van Santen, Steadman, Chiara & Simpson

[57] ABSTRACT

Monocrystalline substrates of gadolinium yttrium penta-ultraphosphate are coated with an epitaxial layer of neodymium yttrium penta-ultraphosphate to produce a wave guiding, laser active, solid state devices. The preparation procedure involves heating a solution of neodymium oxide and yttrium oxide in phosphoric acid to about 500° C. with holding points being interposed at about 180° C. and at about 370° C. After the solution has been held at 500° C. for about 12 through 15 hours, a preformed substrate monocrystal of gadolinium yttrium penta-ultraphosphate is introduced thereinto and a layer of monocrystalline neodymium yttrium penta-ultraphosphate is grown thereon.

11 Claims, No Drawings

PRODUCING LAYERED PENTA-ULTRAPHOSPHATE MONOCRYSTALS

BACKGROUND OF THE INVENTION

The invention concerns an arrangement which has a waveguiding, laser active, epitaxial layer on a substratum and a process for making same.

Lasers can be well integrated into optical circuits as light sources or light amplifiers when the laser active region has the form of an optical waveguide. In the case of solid state lasers, it is necessary that the laser-active material be manufacturable as a thin layer or strip on a substratum which refracts to a lesser extent than the layer itself.

From the publication by H. G. Danielmeyer, entitled "Problems in Solid State XV" (1975), pp. 253-277, stoichiometric neodymium laser substances are known which possess a high degree of light amplification. Lasers which are made from these materials can be miniaturized into lengths having a dimension about 1 mm.

From this same publication, the laser material, neodymium penta-ultraphosphate ($NdP_5O_{14}$) is known. This material has, in addition to a high amplification capacity, excellent spectral laser qualities and an unlimited operational life. This material possesses, however, the disadvantage that it forms mildly ferroelastic twinning domains. These domains act as scattering centers optically and can thereby disturb a stable laser operation.

From the Publication by H. G. Danielmeyer, J. P. Jeser, E. Schroenherr, and W. Stetter, in the Journal of Crystal Growth (1975) pp. 298-302, it is known that neodymium ions can be partially replaced by yttrium ions. Thus, the laser quality of neodymium penta-ultraphosphate can be improved, since the formation of twinning domains in then prevented.

This last mentioned document also discloses a technique for growing crystals of neodymium penta-ultraphosphates. Up until now, it was, however, not possible to manufacture waveguide lasers from this material, because suitable substrates were unknown.

BRIEF SUMMARY OF THE INVENTION

More particularly, the present invention provides in one main aspect, a process for preparing a monocrystalline layer which is laser active and comprised of neodymium yttrium penta-ultraphosphate on a substrate of monocrystalline gadolinium yttrium penta-ultraphosphate. In another aspect, the present invention further provides the structures so prepared.

An object of the present invention is to provide a method for producing a composite structure of a waveguide laser active epitaxial layer upon a supporting substrate so as to produce a solid state structure adapted for incorporation into an optical circuit.

Another object is to provide a structure of the class indicated wherein such layer utilizes a neodymium penta-ultraphosphate which is free from twinning domains.

Another object is to provide a structure of the class indicated wherein the supporting substrate is comprised of a penta-ultraphosphate monocrystal which refracts light to a lesser extent than such layer.

Another object is to provide a process for producing such a composite structure.

Other and further objects, purposes, advantages, aims, utilities, features and the like will be apparent to those skilled in the art from a reading of the present specification taken together with the drawings.

DETAILED DESCRIPTION

A structure according to the invention utilizes a substratum comprised of a monocrystalline gadolinium yttrium penta-ultra-phosphate, characterized by the formula:

$$Gd_{1-z}Y_zP_5O_{14} \qquad (1)$$

wherein:
z is a number between 0 and 1.

The laser active layer utilized comprises in monocrystalline neodymium yttrium penta-ultraphosphate characterized by the formula $$Nd_{1-x}Y_xP_5O_{14} \qquad (2)$$

wherein:
x is a number between 0 and 1.

In a preferred structure of the invention, x has at least the value of at least 0.86 in formula (2) and z has a value of at least 0.67 in formula (1) whereby it is valid that $z - 2.36 \, x - 1.36$.

In an especially preferred structure of the invention x has the value of 0.86, and z the value of 0.67 (in, respectively, formulas (2) and (1)).

It is advantageous, in a structure of this invention to prevent the occurrence of twinning domains by causing x to have a value of at least 0.86.

It is further advantageous to have a layer of laser active material be applied by means of epitaxy onto the substratum. This method of manufacture is preferable vis-a-vis other methods of manufacturing layers because a single crystalline precipitation of the laser active material is thereby positively achieved. The laser active layer of a formula (2) compound thus retains the same excellent qualities as a larger self-supporting monocrystalline piece of the same formula. In such a laser active layer, the loss for a laser wave length transmitted therethrough is minimal, and, in addition, only a minimal broadening of the spectral frequency line is produced.

The following characteristics are associated with a substrate material used in a structure according to the invention:

(1) The crystal lattice of the substrate material is matched to the crystal lattice of the layer of laser active material up to a maximal error of 1%, so that crystal lattice disorders in the epitaxy and stress between the two layers are avoided.

(2) The substrate material is chemically stable relative to the phosphoric acid bath which is used in epitaxy for the manufacture of the laser active layer.

(3) The substrate material has approximately the same linear thermal coefficients of expansion as the laser active material. Between about 500° C. and room temperature, the following relationship is valid:

$$|\alpha_S - \alpha_L| = 20 \cdot 10^{-6} K^{-1},$$

wherein:
$\alpha_S$ is the linear coefficient of expansion of the substrate material,
$\alpha_L$ is the linear coefficient of expansion of the laser active layer, and (4) The refractive index of the substrate material is less than the refractive index of the laser active layer.

(5) The substrate material contains no fluorescent quenching ions. This is especially important when very thin laser active layers are employed in a structure of this invention.

(6) The substrate material manifests substantially no absorption at a laser wave length of about 1.05 μm (microns).

All these characteristics are achieved, and in an optimal fashion, when the laser active layer consists of $Nd_{0.14}Y_{0.86}P_5O_{14}$ and when the substrate consists of $Gd_{0.33}Y_{0.67}P_5O_{14}$. These species correspond to formula (2) where x has the value of 0.86 and to formula (1) where z the value of 0.67.

In general, for any yttrium content in the material of the laser active layer, an optimal relationship of gadolinium to yttrium proportion in the substratum material is achieved when the following is valid:

$$z = 2.36 x - 1.36.$$

where z and x have their above defined meanings. Thus, more specifically, z is the gram molecule proportion of yttrium in the cation crystal lattice of the substrate having a structure as defined by formula (1), and x is the gram molecule proportion of yttrium in cation crystal lattice of the laser active layer having a structure as defined by formula (2). This relationship is valid for the ion radii R when $$R_{Gd} = 1.016 \text{ A}, R_{Nd} 1.077 \text{ A, and } R_Y = 0.971 \text{ A}.$$

The manufacture of a substrate can be accomplished in the following preferred manner: In the above cited publication of H. G. Danielmeyer et al, a suitable apparatus is described. The growth of a monocrystalline substrate is accomplished in a phosphoric acid bath. As a bath container or crucible a gold container is preferably used because of the aggressive nature of phosphoric acid.

In order to obtain large substratum crystals, which is preferred, the following process is utilized. The phosphoric acid is mixed with preferably very pure yttrium oxide ($Y_2O_3$) and gadolinium oxide ($Gd_2O_3$), with 0.2 g of this combined oxide mixture being used for each 10 g of phosphoric acid in a glassy carbon crucible. The degree of purity of the oxide is preferably at least 99.999 weight percent. The mixture proportion of oxides to each other results from a desired gram molecule proportion of yttrium and of gadolinium in the substrate material, that is, in the manufacture of a monocrystal having the structure of formula 1. The quantitative relationship of gadolinium oxide to yttrium oxide amounts to the ratio of (1-z Mol $Gd_2O_3$) to (z Mol $Y_2O_3$) where 2 is as defined above.

Such an oxide mixture in the phosphoric acid is heated to about 180° C. and this temperature is maintained for about two hours to dehydrate the phosphoric acid.

Next, the mixture is heated further to about 370° C. and this temperature is maintained for about 20 hours as a result of which the oxides are completely dissolved in the phosphoric acid.

In each of these procedural steps, the temperature indicated can be maintained for a longer period of time than that indicated; however, the time intervals indicated are advantageous because the manufacturing process is therewith accelerated.

After the oxides are completely dissolved in the phosphoric acid, this heated solution is brought to growth temperature. A temperature of about 500° C. has turned out to be a preferred temperature. After this temperature has been held for about 12 to 15 hours, seed crystals of a compound of formula (1) are added into the heated solution the seed crystals most preferably having a chemical composition corresponding exactly to the substrate structure desired.

Such a temperature of about 500° C. is maintained thereafter for an additional time of 65 to 68 hours, when monocrystals of substrate will have grown to about a maximum size of about 1 cm edge length in one dimension. Such a product crystal has good optical quality.

These crystals are now separated from the solution conveniently by decanting the bath. One can then cool the separated bath. Then the excess phosphoric acid is flushed away with hot water, so that the monocrystalline products remain behind in the containers.

The growth temperature is thus maintained, for a total time of about 80 hours. It is generally not expedient to extend this holding time, because crystal growth is substantially maximized in this time.

Substrate crystals thus grown possess an excellent cleavability in the (0,0,1) plane. For example, from such a grown crystal, (such as one having dimensions of about 1 cm × 0.5 cm × 0.4 cm), one can separate by cleaving about 5 substrates each having a basal planar surface area with dimensions of about 1 cm × 0.5 cm (or 0.5 cm$^2$). The cleavability of these so grown substrate crystals is so good that the roughness of an individual cleavage plane lies under 10 nm. It is thereby andvantgeous that a time consuming polishing of the individual substrate surfaces is no longer necessary.

On the substantially flat surface in the (0,0,1) plane of such a substrate, a laser active layer is applied epitaxially. To produce such a layer a phosphoric acid bath, in which neodymium oxide and yttrium oxide are dissolved is produced. This epitaxial layer growing process corresponds to the manufacture of substrate crystals. A desired composition of a laser active layer of formula (2) above is achieved by selecting the respective ratios employed of neodymium oxide to yttrium oxide according to the relationship (1-x Mol $Nd_2O_3$)/(x Mol $Y_2O_3$). The substrata made of $Gd_{1-z}Y_zP_5O_{14}$ serve as seed nuclei. By the present invention, such a neodymium containing layer on such a substrate is prepared by following a series of steps. In a first step, one mixes a starting material consisting essentially of neodymium oxide and yttrium oxide with phosphoric acid at the rate of at least about 0.2 grams of said starting material for each 10 grams of said phosphoric acid, the mol ratio of neodymium oxide to yttrium oxide in any given said starting material being defined by the relationship:

$$\frac{(1 - x) \text{ Mol } Nd_2O_3}{x \text{ Mol } Y_2O_3}$$

where x is a number between 0 and 1. A most preferred starting material has a purity of at least about 99.999 weight percent based on total weight of said starting material, and a most preferred starting phosphoric acid has a similar purity.

One preferred mixing rate ranges from about 0.2 to 0.4 grams of said starting material for each 10 grams of such phosphoric acid, with a rate of from about 0.25 to 0.35 grams per each 10 grams of such phosphoric acid being more preferred.

Such a mixture is conveniently placed in a crucible comprised of glassy carbon, or the like, due to the aggressive nature of phosphoric acid.

In a second step, one heats the resulting mixture to a first temperature ranging from about 160° to 200° C. for a time sufficient to substantially completely dehydrate said phosphoric acid.

A preferred such first temperature at which to maintain such mixture is about 180° C. A convenient heating time is typically about 2 hours. Longer times can be employed, but do not usually appear to be necessary for complete dehydration.

In a third step, one heats the resulting so heated mixture to a second temperature ranging from about 360° to 430° C. for a time sufficient to substantially completely dissolve all compounds present of neodymium and yttrium (including oxides or temporary compounds) in said phosphoric acid. A preferred such second temperature at which to maintain such mixture is about 370° C. A convenient heating time is about 20 hours. Longer times can be employed, but do not usually appear to be necessary for the desired complete dissolution.

In a fourth step, one heats the resulting solution mixture to a third temperature ranging from about 450° to 500° C. for a time of from about 10 to 15 hours. A preferred third temperature is about 500° C.

In a fifth step, one introduces into the so heated solution mixture the (0,0,1) face of a preformed monocrystalline substrate having the chemical structure:

$$Gd_{1-z}Y_zP_5O_{14}$$

where z is a number between 0 and 1.

In what may be regarded as a sixth step, one maintains the resulting mixture with said substrate so introduced thereinto at said temperature ranging from about 450° to 550° C. (preferably about 500° C.) for a time sufficient to epitaxially grow on such one substrate face a monocrystalline layer which consists of a compound having the chemical structure $$Nd_{1-x}Y_xP_5O_{14}$$

where x is a number between 0 and 1.

In general, such an epitaxially grown layer has a thickness greater than about 30 microns, though thinner layers can be prepared if desired. Typically, such a layer has a thickness not greater than about 200 microns, though thicker layers can be prepared if desired. The exact thickness of the layer grown in any given situation depends upon the end use applications intended. A presently preferred layer thickness falls in the range from about 50 to 100 microns.

For purposes of epitaxially growing such layers, the total time of layer growth in such fourth, fifth, and sixth steps is about 80 hours; longer times can, of course, be employed, but such do not usualy appear to be necessary for the preparation of the preferred classes of layers produced by the practice of the technique of this invention. Shorter total times can be used, for example, if and when thinner layers should be desired. Hence, preferably the duration of the sixth step of such ranges from about 65 to 68 hours.

In what may be regarded as a last step, one separates such a product structure from the residual phosphoric acid. Conventional physical separation procedures are conveniently employed. For example, the residual bath liquid can be decanted from the crystals, and allowed to cool. The remaining then crystals are washed with hot water to remove residual excess phosphoric acid therefrom. Convenient wash water temperatures range from about 50° to 100° C.

This process is preferably so practiced that x has a value of at least about 0.86, z has a value of at least about 0.67, and the following relationship holds:

$$z = 2.36\, x - 1.36.$$

More preferably in this process, x is 0.86 and z is 0.67.

The term "penta-ultraphosphates" as used herein has reference to the phosphorus and oxygen containing moiety identified by the empirical formula $P_5O_{14}$. Other words can be assigned to describe this group, if desired, such as "penta-ultraphosphate", "pentaphosphate", "ultra penta-phosphate", or the like.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

EXAMPLE A

A gadolinium-yttrium penta-ultraphosphate is prepared having the formula:

$$Gd_{0.33}Y_{0.67}P_5O_{14}$$

A particulate starting material composition comprised of 0.33 mol percent of $Gd_2O_3$ (gadolinium oxide) and 0.67 mol percent $Y_2O_3$ (yttrium oxide), which corresponds to 44 weight percent $Gd_2O_3$ and 56 weight percent $Y_2O_3$ on a 100 weight percent total starting composition basis), is admixed with phosphoric acid at the rate of 0.2 grams of starting material composition per each 10 grams of such phosphoric acid. The phosphoric acid and the starting material composition are each in excess of 99.999 weight percent pure. Thus, z in formula 1 has a value of 0.67.

This resulting mixture is placed in a glassy carbon crucible and heated to 180° C. for two hours to remove residual water, after which the mixture is heated to 370° C. for 20 hours at which time the melt is examined and found to be a solution of phosphoric acid wherein the oxides and temperary compounds are completely dissolved. This solution is then further heated to 500° C. for about 15 hours. At this time, a single seed crystal of $$Gd_{0.33}Y_{0.67}P_5O_{14}\ having$$

a size of about 0.2 cm × 0.2 cm × 0.2 cm and a weight of about 0.03 gms is introduced into this heated solution and heating is continued for an additional 65 hours at 500° C.

Thereafter, the residual liquid phosphoric acid is decanted, and the remaining crystal is washed with water at ambient temperatures to remove therefrom traces of phosphoric acid. This crystal has a final size of about 1 cm × 0.5 cm × 0.4 cm and is monocrystalline.

EXAMPLE B

The crystal procedure of Example 1 is cleaved in the (0,0,1) plane. It is found that fine monocrystalline substrates can thus be prepared therefrom. Each substrate has a basal planar surface area with dimensions of about 1 cm × 0.5 cm (or 0.5 cm²) and a thickness of about 0.1 cm. It is observed that the surface roughness of a total cleaving plane characteristically lies below about 10 nm. An expensive polishing of the substrate surfaces is therefore not needed.

EXAMPLE 1

A neodymium-yttrium penta-ultraphosphate layer is prepared having the formula:

$$Nd_{0.14}Y_{0.86}P_5O_{14}$$

A particulate starting material composition comprised of 0.14 mol percent of $Nd_2O_3$ (neodymium oxide) and 0.86 mol percent $Y_2O_3$, is admixed with phosphoric acid at the rate of 0.2 grams of starting material composition per each 10 grams of such phosphoric acid. The phosphoric acid and the starting material composition are each in excess of 99.999 weight percent pure. Thus, x in formula 2 has a value of 0.67.

This resulting mixture is placed in a glassy carbon crucible and heated to 180° C. for two hours to remove residual water, after which the mixture is heated to 370° C. for 20 hours at which time the melt is examined and found to be a solution of phosphoric acid wherein all the oxides and temporary compounds are completely dissolved. This solution is then further heated to 500° C. for about 15 hours. At this time, a single substrate of Example B above is introduced into this heated solution so that a (0,0,1) face thereof is in such solution and is maintained thusly while heating is continued for an additional 20 hours at 500° C.

Thereafter, the resulting structure is withdrawn from the heated solution and is washed with water of about 80° C. to remove therefrom traces of phosphoric acid. The layer so produced has a thickness of about 200 microns.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth in the hereto-appended claims.

We claim:
1. A process for the producing a monocrystalline penta ultraphosphate layer on a monocrystalline penta ultraphosphate substrate comprising the steps of
   (A) mixing a starting material consisting essentially of neodymium oxide and yttrium oxide with phosphoric acid at the rate of at least about 0.2 grams of said starting material for each 10 grams of said phosphoric acid, the mol ratio of neodymium oxide to yttrium oxide in any given said starting material being defined by the relationship:

$$\frac{(1-x) \text{ Mol } Nd_2O_3}{x \text{ Mol } Y_2O_3}$$

where x is a number between 0 and 1,
   (B) first heating the resulting mixture to a temperature ranging from about 160° to 200° C. for a time sufficient to substantially completely dehydrate said phosphoric acid,
   (C) secondly heating the resulting so heated mixture to a temperature ranging from about 360° to 430° C. for a time sufficient to substantially completely dissolve all compounds present of neodymium and yttrium in said phosphoric acid,
   (D) thirdly heating the resulting solution mixture to a temperature ranging from about 450° to 550° C. for a time of from about 10 to 15 hours,
   (E) introducing into the so heated solution mixture the (0,0,1) face of a preformed monocrystalline substrate having the chemical structure:

$$Gd_{1-z}Y_zP_5O_{14}$$

where z is a number between 0 and 1,
   (F) maintaining the resulting mixture with said substrate so introduced thereinto at said temperature ranging from about 450° to 550° C. for a time sufficient to epitaxially grow on said one substrate face a monocrystalline layer which consists of a compound having the chemical structure:

$$Nd_{1-z}Y_xP_5O_{14}$$

where x is a number between 0 and 1, and
   (G) separating a product comprising said substrate and said layer from residual phosphoric acid.
2. The process of claim 1 wherein during said first heating said mixture is maintained at a temperature of about 180° C.
3. The process of claim 1 wherein the time of said first heating is at least about 2 hours.
4. The process of claim 1 wherein during said second heating said mixture is maintained at a temperature of about 370° C.
5. The process of claim 1 wherein the time of said second heating is at least about 20 hours.
6. The process of claim 1 wherein during said third heating said mixture is maintained at a temperature of about 500° C.
7. The process of claim 1 wherein the total time of said third heating, said adding and said maintaining is about least about 80 hours.
8. The process of claim 1 wherein said starting material has a purity of at least about 99.999 weight percent based on total weight of said starting material.
9. The process of claim 1 wherein said mixing rate ranges from about 0.2 to 0.4 grams of said starting material for each 10 grams of said phosphoric acid.
10. The process of claim 1 wherein x has a value of at least about 0.86, z has a value of at least about 0.67, and the following relationship holds:

$$z = 2.36 x - 1.36$$

11. The process of claim 1 wherein x is 0.86 and z is 0.67.